United States Patent [19]
Komura et al.

[11] Patent Number: 5,675,201
[45] Date of Patent: *Oct. 7, 1997

[54] COMPOSITE BEARING STRUCTURE

[75] Inventors: Osamu Komura; Tetsuya Katayama; Akira Yamakawa; Kenji Matsunuma; Norio Yasuoka; Matsuo Higuchi; Masaya Miyake, all of Itami, Japan

[73] Assignee: Sumitomo Electric Industries, Ltd., Osaka, Japan

[*] Notice: The term of this patent shall not extend beyond the expiration date of Pat. No. 5,280,208.

[21] Appl. No.: 295,623

[22] PCT Filed: Jan. 4, 1994

[86] PCT No.: PCT/JP94/00002

§ 371 Date: Aug. 24, 1994

§ 102(e) Date: Aug. 24, 1994

[87] PCT Pub. No.: WO94/16233

PCT Pub. Date: Jul. 21, 1994

[30] Foreign Application Priority Data

Jan. 8, 1993 [JP] Japan ................... 5-002082

[51] Int. Cl.$^6$ ............... H02K 7/08; H02K 7/09; F16C 32/04
[52] U.S. Cl. ............... 31/90.5; 310/90; 384/107
[58] Field of Search ............... 310/90, 905; 384/100, 384/107, 112

[56] References Cited

U.S. PATENT DOCUMENTS

| | | | |
|---|---|---|---|
| 3,377,113 | 4/1968 | Wilson | 310/90 |
| 3,950,039 | 4/1976 | Huber et al. | 384/112 |
| 5,043,615 | 8/1991 | Oshima | 310/90.5 |
| 5,142,173 | 8/1992 | Konno et al. | 310/678 |
| 5,280,208 | 1/1994 | Komura et al. | 510/90 |

FOREIGN PATENT DOCUMENTS

| | | |
|---|---|---|
| 63-22424 | 2/1988 | Japan. |
| 63-171724 | 11/1988 | Japan. |
| 64-12927 | 1/1989 | Japan. |
| 2-184250 | 7/1990 | Japan. |
| 3-28518 | 2/1991 | Japan. |
| 3-186608 | 8/1991 | Japan. |
| 4-31694 | 2/1992 | Japan. |
| 4-31112 | 3/1992 | Japan. |
| 5-106635 | 4/1993 | Japan. |

OTHER PUBLICATIONS

Wear of $Si_3N_4$ Ceramics Measured with Various Testers M. Iwasa et al. Yogyo–Kyokai–Shi, 1985 pp. 73–80.

*Primary Examiner*—Clayton E. LaBalle
*Attorney, Agent, or Firm*—W. G. Fasse; W. F. Fasse

[57] ABSTRACT

A composite bearing structure that has a high rotational accuracy and that can withstand high-speed rotation comprises first bearing means, second bearing means, third bearing means and fourth bearing means. The first bearing means supports a radial impact force which is applied to a rotator during rotation, and is formed by an inner ring (1) and an outer ring (2) consisting of silicon nitride ceramics sintered bodies. The second bearing means supports an axial load which is applied to the rotator while maintaining a prescribed clearance with the rotator, and is formed by a magnetic bearing body of two permanent magnets (12) and (13) which are thrust-directionally opposed to each other. The third bearing means maintains the radial rotational accuracy of the rotator, and is formed by a radial dynamic pressure producing groove (5) which is formed in a cylindrical surface of the inner ring (1). The fourth bearing means maintains the thrust-directional rotational accuracy of the rotator, and is formed by an air dome portion (100) which is confined in a semi-closed state by the inner ring (1), the outer ring (2) and a cover (4).

23 Claims, 8 Drawing Sheets

COMPOSITE BEARING STRUCTURE

FIELD OF THE INVENTION

The present invention generally relates to a bearing structure, and more specifically, it relates to a composite bearing structure, having a prescribed load, for supporting a rotator rotating at a high speed.

BACKGROUND INFORMATION

In recent years there has been achieved an increase in storage capacity and reduction in access time of a hard disk driver (hereinafter referred to as "HDD"). Therefore, a high rotational speed and high rotational accuracy are required for a spindle motor for driving the HDD. In a sliding part of this rotating apparatus, a ball bearing has generally been employed for a bearing part, for example. So far as a conventional ball bearing has been employed, however, the upper withstandable rotational speed has been about 10000 r.p.m., due to a problem of seizure or wear.

In order to drive a precision motor requiring such a high rotational speed and high rotational accuracy at a higher speed, it has been proposed to employ an air bearing (dynamic pressure gas bearing) of ceramics such as SiC or $Si_3N_4$ for a rotary sliding part. When a rotator is driven in a rotating apparatus employing such an air bearing, air is forcibly introduced at least into a clearance between a radial bearing body or a thrust bearing body and the rotator through a groove. Thus, the air pressure in the clearance is increased and the rotator is driven at a high speed and supported by an air bearing which is provided between the respective members. In order to implement high-speed rotation in such a manner, rotational accuracy during high-speed rotation is maintained by the air bearing, and a thrust-directional load which is applied to the rotator is supported by the air bearing. Further, the aforementioned radial bearing body and the rotator can withstand sliding between the respective members in a low-speed range during starting/stopping of the rotator since the same are formed by ceramics materials respectively.

When a conventional radial bearing body which is formed by ceramics such as $Si_3N_4$ is employed in high-speed rotation exceeding 5000 r.p.m., however, an impactive knock wear phenomenon is caused by contact between bearing members. Namely, sliding between the respective members is caused in a high-speed operating range when abrupt radial impact force is applied to the rotator during high-speed rotation. It has been difficult for a conventional ceramics sintered body to withstand the high-speed sliding. Even if a radial bearing body or a thrust bearing body has been formed by an air bearing body consisting of a ceramics sintered body as described above, therefore, it has been difficult to support a radial impact force abruptly applied to a rotator during high-speed rotation, although rotational accuracy in high-speed rotation has been maintained and a thrust-directional load applied to the rotator has been supported.

When the aforementioned air bearing member is made of a ceramics material, further, high machining or production and assembling accuracy is required for the ceramics member, which leads to an increase in manufacturing cost. Further, it is necessary to use the air bearing in a clean environment since it must be protected from penetration of dust. Thus, the structure related to the air bearing is complicated such that a closed or sealed container may be required to enclose the same, and hence the space is disadvantageously increased. In order to solve such a problem, a bushing type slide bearing body which is made of ceramics may be used as a bearing body for high-speed rotation.

Figure 11:
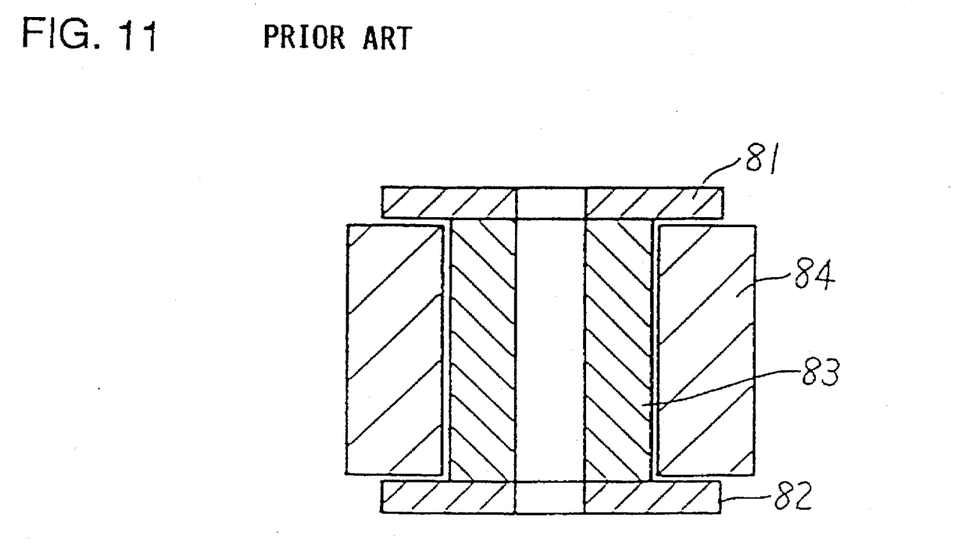
FIG. 11 is a longitudinal sectional view schematically showing the structure of a conventional bushing type slide bearing.

FIG. 11 is a longitudinal sectional view schematically showing the structure of a conventional bushing type slide bearing body made of ceramics. This bushing type slide bearing body comprises two thrust slide bearing bodies 81 and 82, and pairs of radial slide bearing bodies and rotators 83 and 84. The bushing type slide bearing body having such a structure can withstand sliding between the respective members in a low-speed range or region during starting/stopping. However, such a structure suffers an impactive knock wear phenomenon caused by contact between the bearing bodies arising during sliding in high-speed rotation exceeding 5000 r.p.m., similarly to the aforementioned air bearing body of ceramics. Thus, it has been difficult for the conventional bushing type slide bearing body to withstand such sliding, and frictional resistance therein has been disadvantageously increased due to roughening of the sliding surfaces. This tendency is remarkable with respect to a thrust-directional load, in particular. For the same load, the thrust-directional frictional resistance is 5 to 10 times larger than the radial frictional resistance. Even if a bushing type slide bearing body of ceramics has been employed as a bearing body for high-speed rotation, therefore, it has been difficult to support not only an abrupt radial impact force during rotation, but also a thrust-directional load which has been applied to a rotator.

In order to solve such a problem, the inventors have invented a composite bearing structure described in Japanese Patent Application No. 3-298841 and corresponding U.S. Pat. No. 5,280,208 (Komura et al.). According to the inventors, however, it has been proved to be difficult to maintain thrust-directional rotational accuracy with respect to impact or vibration from the exterior in the aforementioned composite bearing structure. When an external impact has been applied to a structural body including a bearing body during high-speed rotation, for example, a rotor has vibrated in an axial direction and a convergence time thereof has been disadvantageously increased.

Accordingly, the present invention has been proposed in order to solve the aforementioned problem, and an object thereof is to provide a structure of a bearing body which can withstand high-speed rotation, and is capable of maintaining high rotational accuracy.

SUMMARY OF THE INVENTION

A composite bearing structure according to the present invention, which which is adapted to support a rotator having a prescribed load and rotating at a high speed, comprises first bearing means, second bearing means, third bearing means, and fourth bearing means. The first bearing means includes a ceramics sintered body for supporting a radial impact force which is applied to the rotator during rotation. The second bearing means supports an axial load which is applied to the rotator while maintaining a prescribed clearance with the rotator. The third bearing means maintains the radial rotational accuracy of the rotator. Further, the fourth bearing means maintains the thrust-directional rotational accuracy of the rotator.

Even if an abrupt radial impact force is applied to the rotator which rotates at a high speed, the ceramics sintered body forming the first bearing means supports the impact force, and can withstand sliding in a high speed area in range according to the present invention. Further, an axial (thrust-directional) load which is applied to the rotator is supported by the second bearing means while maintaining a clearance between the same and the rotator. Even if the rotator rotates at a high speed, therefore, the present arrangement reduces an increasing rate of frictional resistance caused with respect to the thrust-directional load. Further, radial rotational accuracy of the rotator rotating at a high speed is maintained by the third bearing means. The fourth bearing means prevents thrust-directional movement of the rotator caused by an externally applied impact or vibration. Therefore, it is possible to maintain the rotational accuracy, which is required for a precision machine, even after a long period of operation.

As described above, the present invention provides first, second, third and fourth bearing means whereby a wear phenomenon caused by an abrupt impact force during high-speed rotation is avoided, an increase of frictional resistance caused by a thrust-directional load applied to the rotator is suppressed, and the rotational accuracy can be maintained even after a long time of rotation operation. According to the present invention, therefore, it is possible to provide a structure of a composite bearing body which is suitable for supporting a rotator rotating at a high speed with a high rotational accuracy.

According to a preferred first aspect of the present invention, the ceramics sintered body forming the first bearing means includes a silicon nitride ceramics sintered body. Further, this silicon nitride ceramics sintered body contains crystal grains having a linear density of at least 35 per length of 30 µm, and a volume rate ratio of grain boundary phases thereof is not more than 15 volume %. In addition, the sintered body of silicon nitride contains pores of not more than 20 µm in maximum diameter, and the content of the pores is not more than 3%. Such a silicon nitride sintered body has mechanical properties including a JIS three-point bending strength of at least 80 kg/mm$^2$, and preferably at least 100 kg/mm$^2$, and a fracture toughness value of at least 5 MPa·m$^{1/2}$.

More preferably, the JIS three-point bending strength is improved to at least 140 kg/mm$^2$, and wear resistance and impact resistance strength for serving as a bearing member are improved to at least twice those of a sintered body having a linear density of 40, in the sintered body in which the linear density of crystal grains per length of 30 µm is improved to at least 50.

In the preferred first aspect of the present invention, the sintered body of silicon nitride forming the first bearing means contains crystal grains having a linear density exceeding a constant value, while the volume ratio of grain boundaries is suppressed below a constant value and porosity is suppressed below a constant value. Thus, the bearing member is formed by a sintered body of silicon nitride comprising fine crystal grains. Consequently, the silicon nitride sintered body forming the bearing member has an excellent chipping resistance and its surface is not chipped by the falling-out of the crystal grains etc. Thus, the bearing member consisting of the aforementioned silicon nitride sintered body has excellent wear resistance also with respect to high-speed sliding accompanied with a knock wear phenomenon. Therefore, an abrupt radial impact force which is applied to the rotator during high-speed rotation is supported by the aforementioned silicon nitride sintered body, which also exhibits excellent wear resistance with respect to high-speed sliding caused at this time.

In a preferred second aspect of the present invention, the second bearing means includes dynamic pressure gas bearing means which supports a load by a gas pressure produced by rotation of the rotator. Further, the second bearing means includes magnetic bearing means which supports the load through magnetic attraction or repulsion. Each of these dynamic pressure gas bearing means and magnetic bearing means includes a rotating member which rotates with the rotator and a fixed member which is opposed to the rotating member while axially maintaining a clearance therefrom. In the dynamic gas bearing means, the rotating member and the fixed member include ceramics sintered bodies, and either one of the rotating member and the fixed member is provided with a groove for introducing a gas into the clearance for producing the gas pressure. In the magnetic bearing means, the rotating member and the fixed member include magnets for producing magnetic attraction or repulsion in the clearance.

In the second aspect of the present invention, a thrust-directional load which most greatly contributes to an increase of frictional resistance of the bearing body can be supported or reduced by the dynamic pressure gas bearing means through the pressure of the gas which is introduced into the clearance from the groove. Or, the thrust-directional load can be supported or reduced by the magnetic bearing means through repulsion or attraction of the magnets. Thus, an increase of a driving torque with respect to an increase of the rotational speed can be suppressed to an extremely small value. Particularly when the second bearing means is formed by the magnetic bearing means, an increase of the driving torque with respect to an increase of the rotational speed is suppressed to a smaller value as compared with the suppression achieved by the dynamic gas bearing means.

According to a preferred third aspect of the present invention, the third bearing means includes a ceramics sintered body for maintaining rotational accuracy while also maintaining a prescribed clearance with the rotator. In this case, it is possible in principle to improve the rotational accuracy by reducing the clearance to be as narrow as possible.

According to a more preferred third aspect of the present invention, the third bearing means includes dynamic pressure gas bearing means which maintains the rotational accuracy by a gas pressure produced by rotation of the rotator. The dynamic pressure gas bearing means includes a rotating member which rotates with the rotator, and a fixed member which is opposed to the rotating member while radially maintaining a clearance therefrom. The rotating member and the fixed member include ceramics sintered bodies, and either one of the rotating member and the fixed member is provided with a groove for introducing a gas into the clearance for producing the gas pressure. When dynamic pressure gas bearing means is thus employed as the third bearing means, the rotational accuracy can be maintained with high accuracy even during long-time high-speed rotation, and even if the clearance between the rotating member and the fixed member is relatively increased.

In the more preferred third aspect of the present invention, further, the third bearing means includes magnetic bearing means for maintaining rotational accuracy through magnetic attraction or repulsion while also maintaining a prescribed clearance with the rotator. The magnetic bearing means includes a rotating member which rotates with the rotator, and a fixed member which is opposed to the rotating member while radially keeping a clearance therebetween. The rotating member and the fixed member include magnets for producing magnetic attraction or repulsion in the clearance. The rotating member and the fixed member consist of ceramics sintered bodies, and the magnets are buried in the interior of the ceramics sintered bodies. Also when a magnetic bearing means is thus employed as the third bearing means, the rotational accuracy can be maintained in with high accuracy even if high-speed rotation is continued for a long time in a condition in which the clearance between the rotating member and the fixed member is relatively increased.

In a more preferred fourth aspect of the present invention, the fourth bearing means includes a gas dome portion which is confined in a semi-closed state by a rotating member rotating with the rotator and a fixed member axially opposed to the rotating member. When introduction or discharge of air is not performed smoothly through a radial clearance in the interior of the bearing, the pressure in the gas dome portion fluctuates due to an impact or vibration applied from the exterior. Even if the rotator is driven by the external impact or vibration to move in the thrust direction, the pressure fluctuation in the gas dome portion will act in a direction that inhibits the thrust-directional movement of the rotator in this case. Thus, the rotator is inhibited from carrying out thrust-directional movement. Consequently, the amount of thrust-directional movement of the rotator, the width or extent of thrust-directional vibration of the rotator, and a convergence time thereof are reduced as compared with the prior art, whereby thrust-directional rotational accuracy is improved.

The semi-closed state of the gas dome portion is now described. Air in the gas dome portion can be supplied or discharged through the clearance in the bearing. However, air cannot be smoothly supplied or discharged as the radial clearance in the bearing is reduced. Therefore, the supply or discharge of air will not follow or continue smoothly if the rotator moves in the thrust direction in response to an external applied impact or vibration; and the pressure in the gas dome portion is changed. In this condition, the gas dome portion is said to be confined in a semi-closed state. The aforementioned phenomenon remarkably starts to appear when the radial clearance in the bearing is at a degree of about 50 μm or less. A bearing which is employed for a rotating apparatus such as an HDD has a clearance of not more than 20 μm. Therefore, an effect based on the aforementioned phenomenon can be sufficiently applied to a bearing for a driving motor of an HDD or the like in practice.

Further, the rotating member for confining the gas dome portion includes first and second rotating portions. The first rotating portion is opposed to the fixed member while radially keeping a clearance therefrom. The second rotating portion, which is opposed to the fixed member with the gas dome portion axially interposed therebetween, is fixed to the first rotating portion. When the second or third bearing means is formed by dynamic pressure gas bearing means, the second rotating portion has a hole. A gas which is introduced into the prescribed clearance by the dynamic pressure gas bearing means is discharged through the hole provided in the second rotating portion. In this case, the rotator is held in a position that balances the pressure in the gas dome portion and the driving force caused by the air discharged from the hole of the second rotating portion. At this time, it is necessary to reduce the diameter of the hole of the second rotating portion to such a degree so as to cause pressure fluctuation in the gas dome portion. Thus, inflow or/discharge of air in the bearing is not smoothly performed if an external impact or vibration is applied to the rotator which thus moves in the thrust direction. Therefore, as a result, the pressure in the gas dome portion fluctuates and exerts a force that acts in a direction for returning the internal pressure to the original level. Consequently, the rotator is thrust-directionally pushed back to the original position.

According to the present invention, as hereinabove described, it is possible to provide structures of various composite bearing bodies that are suitable for supporting rotators rotating at high speeds, and that have excellent impact resistance and vibration resistance.

DETAILED DESCRIPTION OF PREFERRED EXAMPLE EMBODIMENTS AND THE BEST MODE FOR CARRYING OUT THE INVENTION

Various structural examples of the inventive composite bearing body are shown in Table 1. Table 1 shows structural examples A to F as combinations of radial bearing means (first and third) and thrust bearing means (second). Schematic structures of the respective structural examples are shown in FIGS. 1 to 6 in correspondence to examples A to F. With reference to Table 1 and the respective figures (FIGS. 1 to 6), embodiments of structures of composite bearing bodies are now described in order.

TABLE 1

| | | Radial Bearing Means (first and third) | | |
| --- | --- | --- | --- | --- |
| | | Ceramics Air Bearing | Magnetic Bearing + Ceramics Bushing | Ceramics Bushing |
| Thrust Bearing Means (second) | Ceramics Air Bearing | A (FIG. 1) | B (FIGS. 2A and 2B) | C (FIG. 3) |
| | Magnetic Bearing | D (FIG. 4) | E (FIGS. 5A and 5B) | F (FIG. 6) |

Structural Example A

Figure 1:
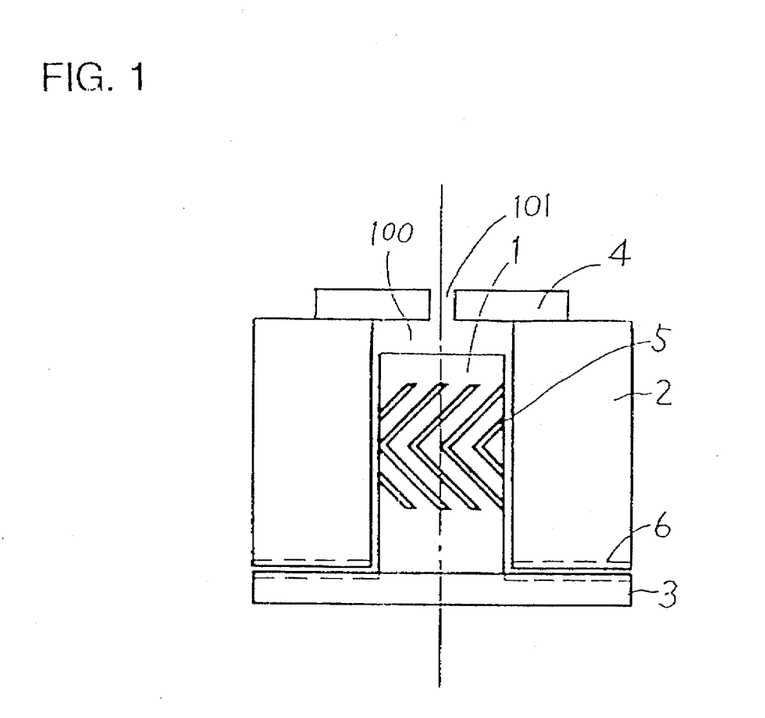
FIG. 1 is a conceptual diagram schematically showing a structural example A of a composite bearing body according to the present invention.

FIG. 1 is a conceptual diagram schematically showing a composite bearing structure according to an embodiment A of the present invention. As shown in FIG. 1, the composite bearing structure comprises a cylindrical stub or inner ring 1, a cylindrical shell or outer ring 2, a lower thrust plate 3 and a cover 4. The cover 4 is bonded to the outer ring 2. The respective members 1 to 3 consist of silicon nitride ceramics sintered bodies. The inner ring 1 has a cylindrical shape, adapted to enclose or surround an outer peripheral surface of a prescribed shaft. A plurality of V-shaped radial dynamic pressure producing grooves 5 are formed in the cylindrical surface of the inner ring 1. The lower thrust plate 3 is arranged to be in contact with an end surface of the inner ring 1. The outer ring 2 having a cylindrical shape is arranged to have prescribed clearances relative to the cylindrical surface of the inner ring 1 and an inner side surface of the lower thrust plate 3. A plurality of spiral thrust dynamic pressure producing grooves 6 are formed in surfaces of the outer ring 2 and the lower thrust plate 3 which are opposed to each other. While the thrust dynamic pressure producing grooves 6 are formed in both of the outer ring 2 and the lower thrust plate 3 in the example embodiment shown, these grooves may alternatively be formed in only either one of the ring 2 and the plate 3. Further, the cover 4 has a small air vent hole 101. This air vent hole 101 is adapted to bleed air which is introduced along the dynamic pressure producing grooves 5 and 6 during rotation. A portion enclosed within the inner ring 1, the outer ring 2 and the cover 4 defines an air dome portion 100 which is confined in a semi-closed state.

In the composite bearing body structured in the aforementioned manner, it is assumed that the outer ring 2 and the cover 4 rotate with a rotator, and the inner ring 1 and the thrust plate 3 are fixed to the prescribed shaft. When the outer ring 2 rotates with the rotator, air is introduced between the outer ring 2 and the inner ring 1 and between the outer ring 2 and the lower thrust plate 3 along the radial dynamic pressure producing grooves 5 and the thrust dynamic pressure producing grooves 6, so that the clearances between the same are kept constant respectively. Thus, an air bearing is formed or defined in this manner. The outer ring 2 rotating with the rotator can be driven at a high speed without being in contact with the inner ring 1 and the lower thrust plate 3, by air pressures which are produced in the respective clearances.

According to the structural example A, both of a radial bearing body and a thrust bearing body are formed by ceramics air bearing bodies. Therefore, radial rotational accuracy is maintained by the radial air bearing, while a thrust-directional load is supported by the thrust air bearing body. Further, ceramics sintered bodies forming the respective air bearing bodies are formed by silicon nitride sintered bodies as described later, whereby an abrupt radial impact force applied during high-speed rotation is supported by the silicon nitride sintered bodies.

When an external impact or vibration is applied during high-speed rotation, the outer ring 2 and the cover 4 are to move vertically, i.e., in the thrust direction. Following such a vertical movement of the outer ring 2 and the cover 4, the air pressure in the air dome portion 100 fluctuates. Thus, a force acts in a direction opposite to that of the movement of the outer ring 2 and the cover 4, due to a pressure difference between the external atmosphere and the air dome portion 100. Consequently, the thrust-directional movement of the outer ring 2 and the cover 4 caused by an external vibration or impact which is applied during high-speed rotation is suppressed to a slight fluctuation. Namely, the air pressure fluctuation in the air dome portion 100 absorbs the thrust-directional movement of the outer ring 2 and the cover 4. In this case, the air vent hole 101 has the minimum size required for bleeding air which is introduced along the dynamic pressure producing grooves. It is necessary to reduce the size of the air vent hole 101 to such a degree that entrance/discharge of air therethrough cannot follow the vertical movement of the outer ring 2 and the cover 4.

Structural Example B

Figure 2A:
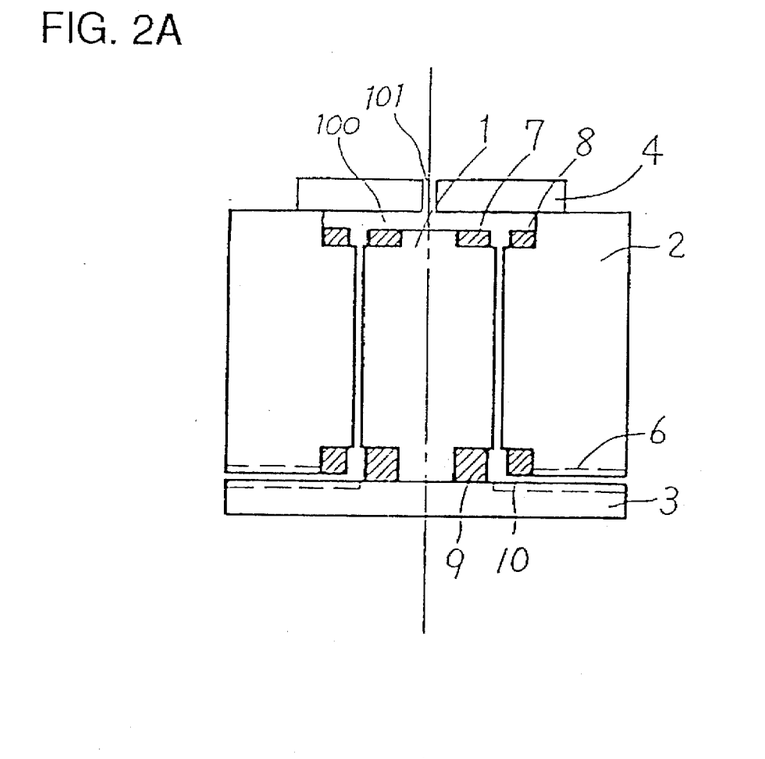
FIGS. 2A and 2B are conceptual diagrams schematically showing two types of a structural example B of the composite bearing body according to the present invention.
Figure 2B:
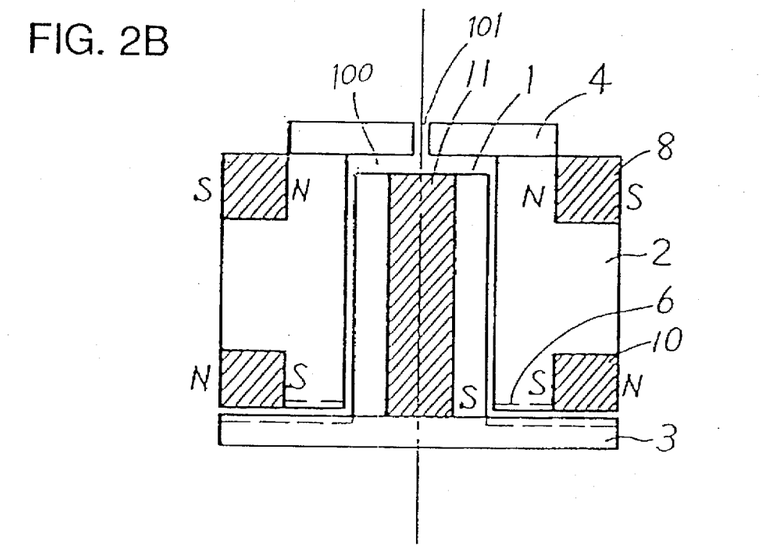

FIGS. 2A and 2B are conceptual diagrams schematically showing composite bearing structures according to an embodiment B of the present invention. As shown in FIG. 2A, a composite bearing body comprises an inner ring 1, an outer ring 2, a lower thrust plate 3 and a cover 4. The respective members 1 to 3 mainly consist of silicon nitride ceramics sintered bodies. The lower thrust plate 3 is arranged to be in contact with an end surface of the inner ring 1. The outer ring 2 is arranged to maintain prescribed clearances relative to a cylindrical surface of the inner ring 1 and an inner side surface of the lower thrust plate 3. In the case of this structural example B, permanent magnets 7 to 10 are arranged on cylindrical surfaces of the inner ring 1 and the outer ring 2 which are opposed to each other respectively. Further, thrust dynamic pressure producing grooves 6 are formed in surfaces of the outer ring 2 and the lower thrust plate 3 which are opposed to each other, in the form of a plurality of spirals. The clearance between the inner ring 1 and the outer ring 2 is defined by a first clearance between the ceramic sintered bodies forming the respective members, and a second clearance between the permanent magnets 7 (9) and 8 (10). The second clearance is larger than the first clearance.

The cover 4 is bonded to the outer ring 2. A space enclosed within the inner ring 1, the outer ring 2 and the cover 4 defines an air dome portion 100 for buffering thrust-directional impact or vibration. The cover 4 has an air vent hole 101. The air vent hole 101 has the minimum size required for bleeding air which is introduced along the thrust dynamic pressure producing grooves. The size of the air hole 101 is suppressed or reduced to such a degree that entrance/discharge of air therethough cannot follow the vertical movement of the outer ring 2 and the cover 4.

When the outer ring 2 rotates with a rotator in the composite bearing body structured in the aforementioned manner, air is introduced between the outer ring 2 and the lower thrust plate 3 along the thrust dynamic pressure producing grooves 6, whereby the clearance therebetween is kept constant, and a thrust air bearing body is defined. In the radial direction, on the other hand, a constant clearance is maintained by repulsion produced between the permanent magnets 7 (9) and 8 (10), whereby rotational accuracy during high-speed rotation is maintained. Even if an abrupt radial impact force is applied to the rotator at this time, but between high strength the silicon nitride sintered bodies of the inner ring 1 and the outer ring 2 come into contact with each other, while the permanent magnets do not contact each other. Therefore, no impactive knock wear phenomenon is caused by contact between the inner ring 1 and the outer ring 2, or more specifically the magnets thereof, during sliding occurring in the high-speed rotation.

As hereinabove described, not only is the radial rotational accuracy maintained and the thrust-directional load supported, but also an abrupt impact force in the radial direction and the thrust direction is withstood, in the structural example B.

FIG. 2B shows another type of the structural example B. A point which is different from the structure shown in FIG. 2A resides in that a permanent magnet 11 is embedded in the interior of an inner ring 1, and permanent magnets 8 and 10 are provided on outer peripheral cylindrical surfaces of an outer ring 2. In this case, the permanent magnets 8 (10) and 11 produce repulsion through the ceramics sintered bodies forming the inner ring 1 and the outer ring 2. Thus, a clearance between the inner ring 1 and the outer ring 2, which is required for maintaining a prescribed rotational accuracy, is set in consideration of the repulsion between the magnets.

Structural Example C

Figure 3:
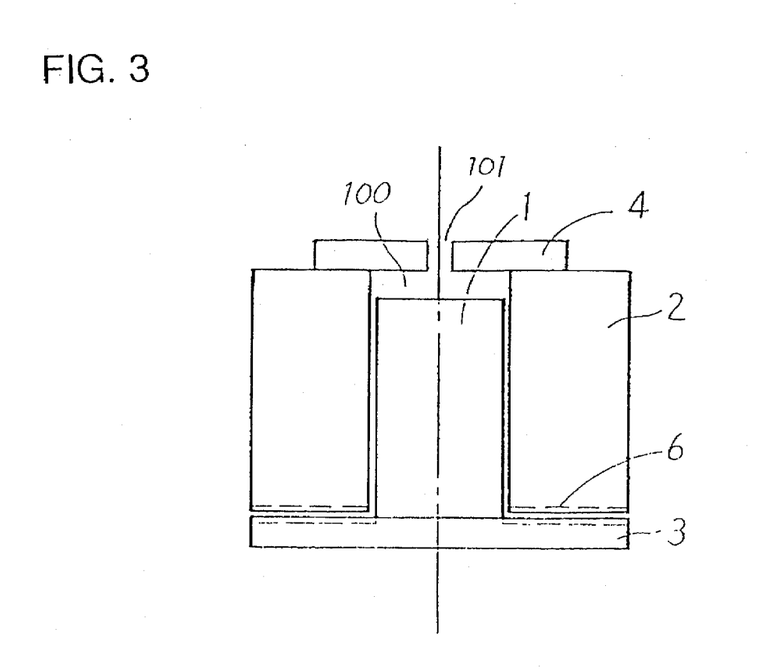
FIG. 3 is a conceptual diagram schematically showing a structural example C of the composite bearing body according to the present invention.

FIG. 3 is a conceptual diagram schematically showing a composite bearing structure according to an embodiment C of the present invention. As shown in FIG. 3, a composite bearing body comprises an inner ring 1, an outer ring 2, a lower thrust plate 3 and a cover 4. The cover 4 is bonded to the outer ring 2. The cover 4 has an air vent hole 101. The air vent hole 101 has the minimum size required for bleeding air which is introduced by thrust dynamic pressure producing grooves 6. The respective members 1 to 3 consist of silicon nitride ceramics sintered bodies. The inner ring 1 has a cylindrical shape envelope or surround an outer peripheral surface of a prescribed shaft. The lower thrust plate 3 is arranged to be in contact with an end surface of the inner ring 1. The outer ring 2 is arranged to maintain prescribed clearances relative to the lower thrust plate 3 and the inner ring 1 respectively. Spiral thrust dynamic pressure producing grooves 6 are formed in surfaces of the outer ring 2 and the lower thrust plate 3 which are opposed to each other. The clearance between the inner ring 1 and the outer ring 2 is set at a small value, to be capable of maintaining a prescribed rotational accuracy during high-speed rotation.

Thus, a thrust-directional load is supported by an air bearing body defined in the aforementioned manner, and the radial rotational accuracy is maintained by the small clearance between the inner ring 1 and the outer ring 2. Further, an abrupt radial impact force applied during high-speed rotation is supported by the high strength silicon nitride ceramics sintered bodies forming the inner ring 1 and the outer ring 2.

Further, thrust-directional impact or vibration during high-speed rotation is absorbed by an air dome portion 100 which is enclosed within the inner ring 1, the outer ring 2 and the cover 4.

Structural Example D

Figure 4:
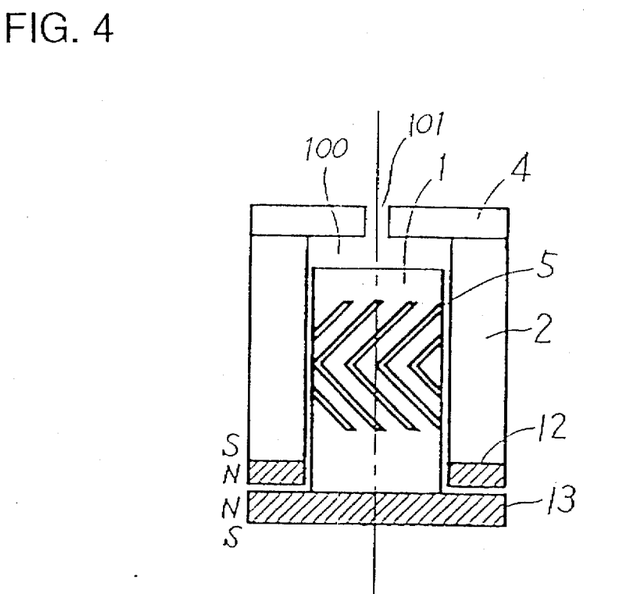
FIG. 4 is a conceptual diagram schematically showing a structural example D of the composite bearing body according to the present invention.

FIG. 4 is a conceptual diagram schematically showing a composite bearing structure according to an embodiment D of the present invention. As shown in FIG. 4, a composite bearing body comprises an inner ring 1, an outer ring 2, a lower thrust plate 13 and a cover 4. The inner ring 1 and the outer ring 2 are mainly formed by silicon nitride ceramics sintered bodies. The inner ring 1 has a cylindrical shape adapted to surround or envelope an outer peripheral surface of a prescribed shaft. A plurality of V-shaped radial dynamic pressure producing grooves 5 are formed in the cylindrical surface of the inner ring 1. The lower thrust plate 13 consists of a permanent magnet. A ring-shaped permanent magnet 12 is provided on a surface of the outer ring 2 which is opposed to the lower thrust plate 13.

The cover 4 is bonded to the outer ring 2. The cover 4 has an air vent hole 101. The air vent hole 101 has the minimum size required for bleeding air which is introduced by the radial dynamic pressure producing grooves 5.

When the outer ring 2 rotates with a rotator in the composite bearing body formed in the aforementioned manner, air is introduced between the inner ring 1 and the outer ring 2 along the radial dynamic pressure producing grooves 5, so that a clearance therebetween is maintained constant. Thus, an air bearing body is defined, whereby the radial rotational accuracy is maintained. Further, the permanent magnet 12 of the outer ring 2 and the lower thrust plate (permanent magnet) 13 produce a mutual repulsion, whereby a prescribed clearance is kept between the outer ring 2 and the lower thrust plate 13. Thus, a thrust load during high-speed rotation is supported. Further, the inner ring 1 and the outer ring 2 are high strength silicon nitride sintered bodies, whereby a knock wear phenomenon does not take place even if an abrupt impact force is applied during high-speed rotation and the inner ring 1 comes into contact with the outer ring 2. In addition, any thrust-directional impact or vibration during high-speed rotation is absorbed by the action of an air dome portion 100 which is enclosed within the inner ring 1, the outer ring 2 and the cover 4.

According to the structural example D, as hereinabove described, the rotational accuracy is maintained and the thrust-directional load is supported during high-speed rotation, and the provided composite bearing body can withstand any impact force occurring during high-speed rotation.

Structural Example E

Figure 5A:
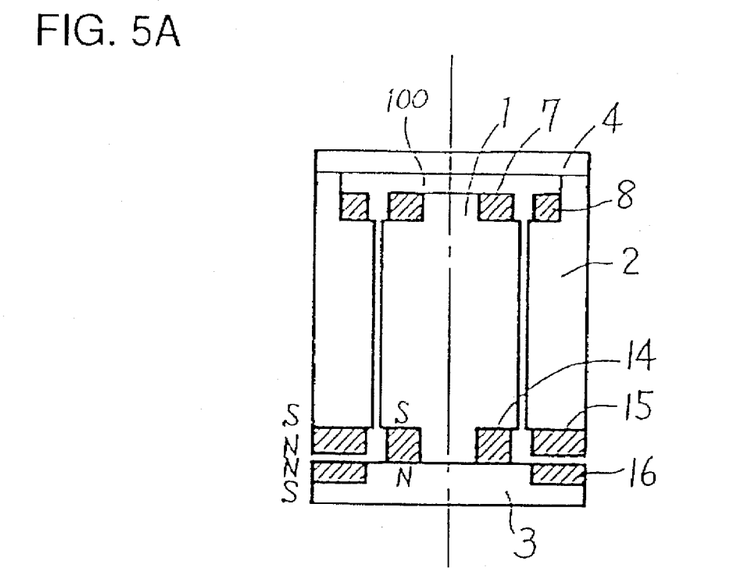
FIGS. 5A and 5B are conceptual diagrams schematically showing two types of a structural example E of the composite bearing body according to the present invention.

FIGS. 5A and 5B are conceptual diagrams showing structures of composite bearing bodies according to an embodiment E of the present invention. As shown in FIG. 5A, a composite bearing body comprises an inner ring 1, an outer ring 2, a lower thrust plate 3 and a cover 4. The cover 4 is bonded to the outer ring 2. The respective members 1 to 3 are mainly formed by silicon nitride ceramics sintered bodies. A point which is different from the structural example B (FIG. 2A) resides in a structure of the bearing body in the thrust direction. Permanent magnets 15 and 16 are provided on surfaces of the outer ring 2 and the lower thrust plate 3 which are opposed to each other. The permanent magnet 15 is arranged so as to be opposed also to a permanent magnet 14 of the inner ring 1. Thus, a thrust-directional load is also supported by a magnetic bearing body. According to this structural example E, radial rotational accuracy is maintained by the magnetic bearing body, a thrust-directional load is supported by the magnetic bearing body, and radial impact force is supported by the high strength ceramics sintered bodies. Thrust-directional impact or vibration is absorbed by a suppressive force caused by an air pressure fluctuation of an air dome portion 100 which is enclosed within the inner ring 1, the outer ring 2 and a cover 4. This air dome 100 does not have a vent hole.

Figure 5B:
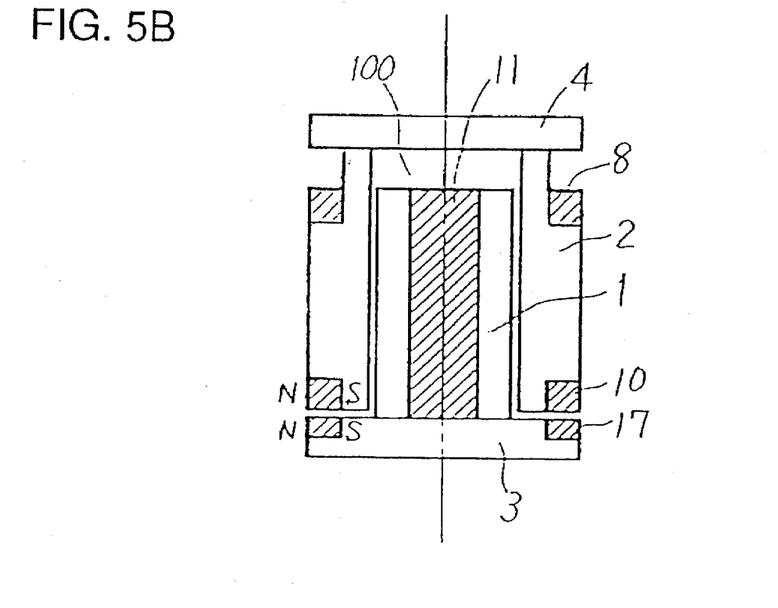

FIG. 5B shows another type of the structural example E. A point which is different from the structural example B (FIG. 2B) resides in that a thrust-directional load is supported not by an air bearing body, but by a magnetic bearing body. Namely, a permanent magnet 17 of a lower thrust plate 3 is arranged opposite a permanent magnet 10 of an outer ring 2.

Structural Example F

Figure 6:
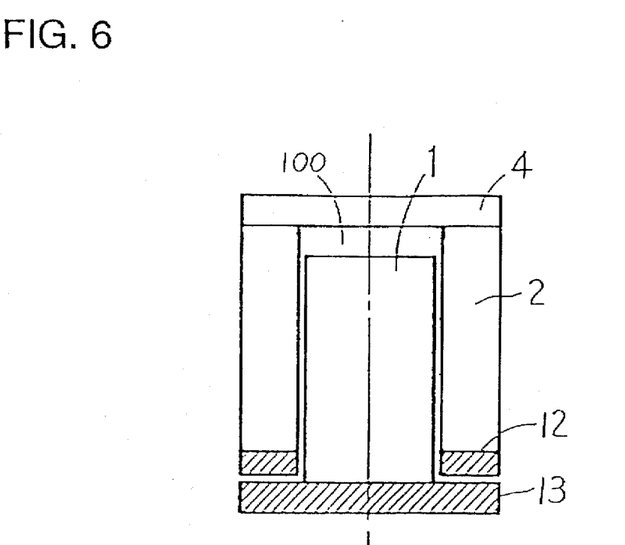
FIG. 6 is a conceptual diagram schematically showing a structural example F of the composite bearing body according to the present invention.

FIG. 6 is a conceptual diagram schematically showing the structure of a composite bearing body according to an embodiment F of the present invention. As shown in FIG. 6, the composite bearing body comprises an inner ring 1, an outer ring 2, a lower thrust plate 13 and a cover 4. The cover 4 is bonded to the outer ring 2. The inner ring 1 and the outer ring 2 are mainly formed by silicon nitride ceramics sintered bodies. The inner ring 1 has a cylindrical shape adapted to surround or envelope an outer peripheral surface of a prescribed shaft. The lower thrust plate 13 is arranged to be in contact with an end surface of the inner ring 1. The lower thrust plate 13 consists of a permanent magnet. A permanent magnet 12 is provided on a surface of the outer ring 2 which is opposed to the lower thrust plate 13. A clearance between the inner ring 1 and the outer ring 2 is set at a small value to be capable of maintaining a prescribed rotational accuracy during high-speed rotation. Thus, a thrust-directional load is supported by repulsion produced by the permanent magnet 12 and the lower thrust plate (permanent magnet) 13, while a radial impact force is supported by the high strength silicon nitride sintered bodies forming the inner ring 1 and the outer ring 2. Further, thrust-directional impact or vibration is absorbed by the action of an air dome portion 100 which is enclosed within the inner ring 1, the outer ring 2 and the cover 4.

Summarizing the aforementioned structural examples A to F, it is possible to attain a simplification of structures in the magnetic bearing bodies of the structural examples D to F as compared with the air bearing bodies of the structural examples A to C, as to a support structure for a thrust-directional load. When a thrust-directional load is supported by an air bearing body, a certain area is required in order to ensure generation of the required lifting power. Furthermore, a magnetic bearing body produces lifting power from the very start of rotation, while an air bearing body does not produce lifting power until a constant or certain rotational frequency speed is exceeded.

As a means for improving the radial rotational accuracy, it is effective to use an air bearing body (structural example A or D), or a magnetic bearing body (structural example B or E) as a radial bearing body. Also when a bushing type slide bearing body is employed, it is possible to improve the rotational accuracy by setting a clearance gap between an inner ring and an outer ring at a small value (structural example C or F).

Every structural example discussed above can satisfy or achieve radial impact resistance. In every structural example, seizure does not result even if an impact force is applied during high-speed rotation so as to bring the inner ring and the outer ring into contact with each other. Particularly when silicon nitride ceramics sintered bodies of high strength are employed, excellent bearing characteristics can be maintained since neither breaking nor chipping is caused.

A method of manufacturing a silicon nitride sintered body as a material for a radial impact resistance member in a composite bearing structure according to an Example of the present invention will now be described.

Raw material powder of $Si_3N_4$ having a mean particle size of 0.3 µm, particle size distribution of $3\sigma=0.20$ µm, an $\alpha$ crystallization rate of 96.5% and an oxygen content of 1.4 weight % was prepared. 92 weight % of this raw material powder of $Si_3N_4$, 4 weight % of $Y_2O_3$ powder of 0.8 µm in mean particle size, 3 weight % of $Al_2O_3$ powder of 0.5 µm in mean particle size, and 1 weight % of AlN powder of 1.0 µm in mean particle size were wet-blended in ethanol for 100 hours through a ball mill. Thereafter a mixed powder obtained by drying the above blended materials was CIP (cold isostatic press) molded under a pressure of 5000 $kg/cm^2$. The compact as obtained was held under a nitrogen gas atmosphere of 1 atm. pressure at a temperature of 1600° C. for 4 hours. Further, sintering treatment was carried out at a temperature of 1750° C. for 6 hours, to obtain a sintered body. Thereafter HIP (hot isostatic press) treatment of 2 hours was carried out on this sintered body at a temperature of 1700° C. in a nitrogen gas atmosphere of 1000 atm pressure.

In the sintered body of silicon nitride thus obtained, a mean major axis particle size was not more than 5 µm, an aspect ratio of its crystal grains was at least 4, and the maximum major axis size was not more than 15 µm. This sintered body had mechanical properties including a JIS three-point bending strength of at least 80 $kg/mm^2$ and a fracture toughness value of at least 5 $MPa \cdot m^{1/2}$. Test pieces were cut from the sintered body as obtained, and subjected to evaluation of wear resistance in accordance with an Amsler abrasion test.

Figure 7A:
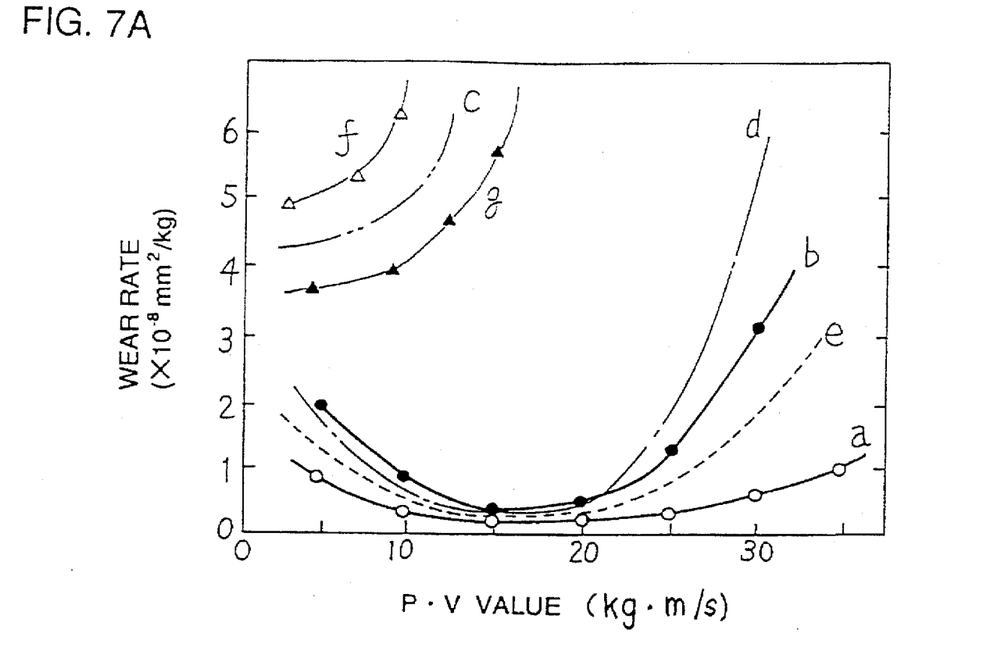
FIGS. 7A and 7B are graphs showing the relations between wear rates and P·V values of a sintered body forming a radial impact resistance member in a composite bearing structure according to the present invention, in comparison to those of conventional and comparative examples.

FIG. 7A is a graph showing the relations between products (P·V) of loads applied to the samples and rotational speeds, and wear rates. Referring to FIG. 7A, respective curves a to g show measurement results obtained by the following samples:

Sample a: Inventive Example

A silicon nitride sintered body obtained by the aforementioned manufacturing method, having linear density of crystal grains of 40 per length of 30 µm, a volume ratio of grain boundary phases of 8 volume %, porosity of 0.05%, and a maximum pore diameter of 8 µm.

Sample b: Comparative Example

A silicon nitride sintered body obtained by the aforementioned manufacturing method, having linear density of crystal grains of 30 per length of 30 µm, a volume ratio of grain boundary phases of 16 volume %, porosity of 3.2%, and a maximum pore diameter of 22 µm.

Sample c, d, e: Conventional Examples

Samples of a silicon nitride sintered body shown in Yogyo Kyokai-Shi, 1985, Vol. 93, pp. 73 to 80 (FIG. 3 in particular).

Sample f: Commercially Available Alumina Sintered Body

Sample g: Commercially Available Silicon Carbide Sintered Body

The Amsler abrasion test was carried out by fixing two ring-shaped samples ($\phi 16$ mm×$\phi 30$ mm×8 mm) to a rotary shaft of a tester in such a state that circumferential surfaces thereof were correctly in contact with each other, applying a prescribed load, and driving the rotary shaft at a prescribed rotational frequency or speed, thereby carrying out a sliding test of about 100000 total revolutions, and thereafter measuring the resulting degrees of reduction in weight of the two samples.

Figure 7B:
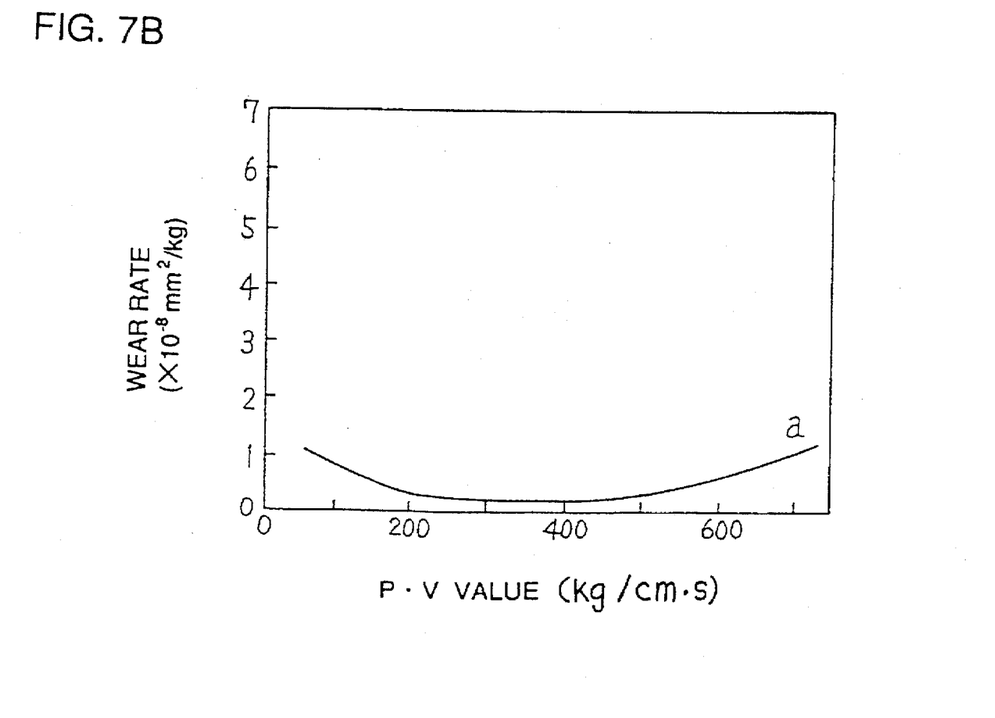

As clearly understood from FIG. 7A, the sintered body according to the present invention is extremely excellent in wear resistance. FIG. 7B shows the values of P·V (kg·m/s) in FIG. 7A in terms of those per unit area of a sliding surface.

Consider that a sintered body which is prepared in the aforementioned manner is exposed to sliding during high-speed rotation of a spindle motor for a hard disk driver, for example. A single hard disk has a thickness of about 2 mm in a disk of about φ50 to 200 mm. Further, a plurality of hard disks may be overlapped or stacked over each other and driven to rotate. The weight of such a hard disk is about 20 to 1000 g. Assuming that the diameter of a bearing body supporting the aforementioned hard disk is 10 mm and the rotational frequency of the hard disk is 2000 to 50000 r.p.m., therefore, its peripheral speed is 100 to 2600 cm/s. Assuming that a bearing area is 3.14 cm$^2$ at this time, the value of P·V (kg/cm·s) is 1 to 828 kg/cm·s. Refer to FIG. 7B with respect to P·V values in this range. The sintered body according to the present invention exhibits low wear rates with respect to P·V values of a wide range of 1 to 600 kg/cm·s, and can sufficiently withstand sliding in high-speed rotation of the aforementioned hard disk.

Namely, a case in which the sintered body regularly slides during high-speed rotation is considered in the aforementioned example. Also in that case, the sintered body according to the present invention exhibits low wear rates with respect to P·V values over a wide range, whereby the sintered body according to the present invention can sufficiently withstand sliding even if an abrupt impact force is applied during high-speed rotation which thereby causes sliding during the high-speed rotation.

Then, spindle motors were prepared as to the respective cases of the aforementioned structural examples F and C, and subjected to evaluation of changes in thrust-directional rotational accuracy upon application of impact during high-speed rotation.

Figure 8:
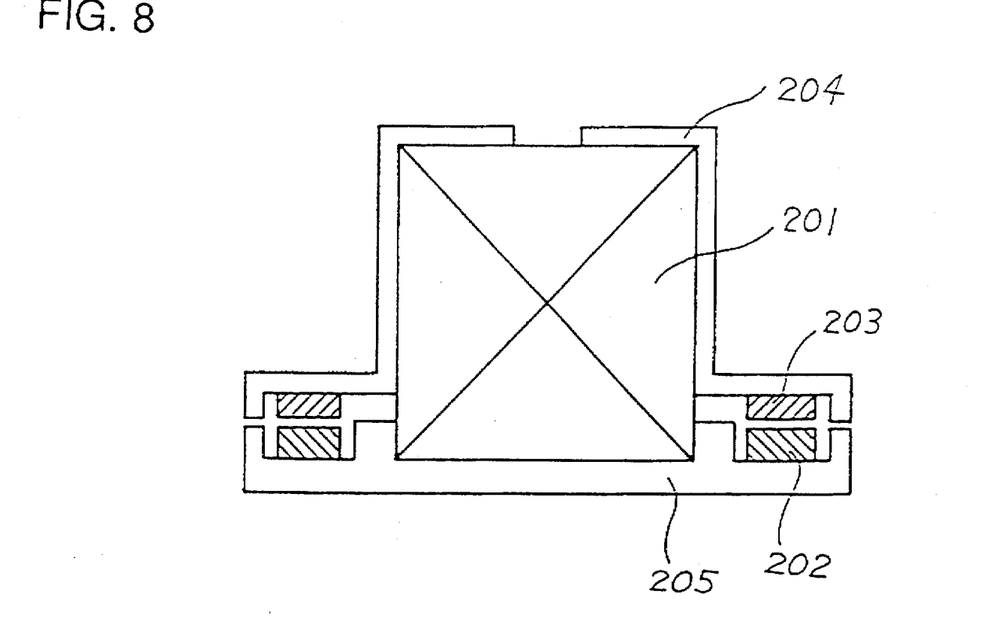
FIG. 8 is a schematic diagram showing the structure of a spindle motor employed for evaluating bearing performance of the structural examples C and F of the composite bearing body according to the present invention.

FIG. 8 is a schematic diagram showing the structure of a spindle motor employed for the aforementioned evaluation.

Referring to FIG. 8, a bearing of the structural example F is mounted on a portion of a bearing 201 of the spindle motor. A rotating portion of the bearing is mounted on a hub 204, while a fixed portion of the bearing is mounted on a mounting base material 205. A rotor magnet 203 which is mounted on the hub 204 is arranged to be opposed to a motor coil 202 which is arranged on the mounting base material 205.

Figure 9A:
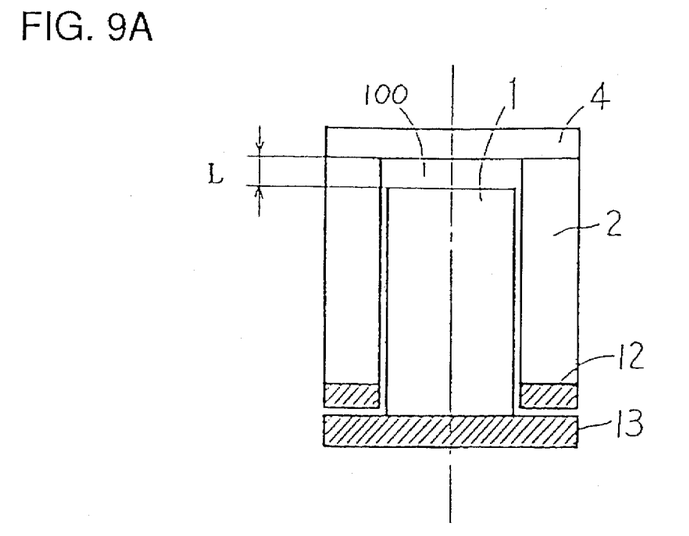
FIG. 9A is a schematic diagram showing Example (A) as a bearing employed for evaluating bearing performance of the structural example F of the composite bearing body according of the present invention.
Figure 9B:
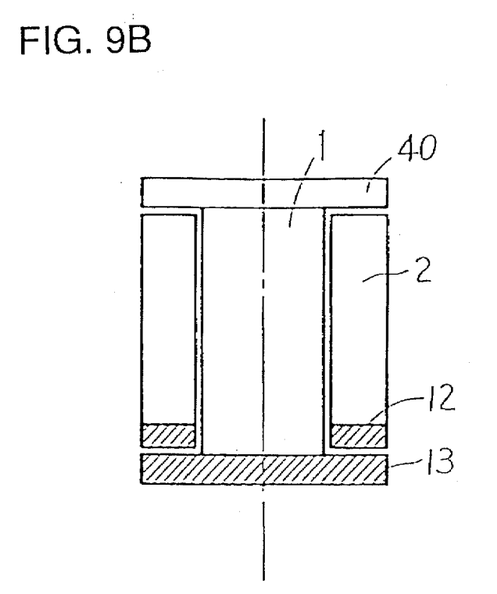
FIGS. 9B and 9C are schematic diagrams showing structures of comparative examples (B) and (C).
Figure 9C:
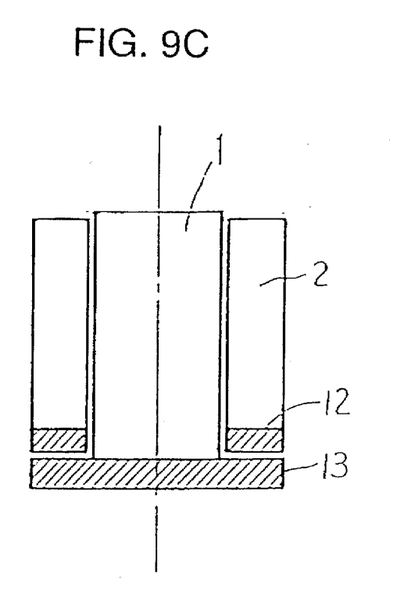

In order to evaluate the bearing performance of the structural example F, three types of bearings of Example (A) and comparative examples (B) and (C) shown in FIGS. 9A, 9B and 9C were mounted on the portion of the bearing 201 of the spindle motor to carry out an evaluation test. The evaluation test was carried out by applying an impact of 0.3 N·m from the exterior while making the hub 204 rotate at 30,000 r.p.m. An upper surface of the hub 204 was measured with a laser displacement gauge, to measure amounts of upward displacement of the hub 204. Further, the extent of fluctuation of the motor current corresponding to torque fluctuation was also measured.

In comparative example (B), a thrust plate 40 was provided on an upper portion of the bearing, and a clearance between an outer ring 2 and the thrust plate 40 was set at 40 μm, as shown in FIG. 9B. In the structure of comparative example C (FIG. 9C), an upper portion of the bearing was opened. In the three bearing structures of examples (A) to (C), the outer diameters of the inner rings 1 were φ10 mm, and the radial clearances were 10 μm.

Results of the aforementioned evaluation are shown in Table 2.

TABLE 2

|  | Amount of Upward Displacement of Hub (μm) | Amount of Fluctuation of Motor Current (A) |
|---|---|---|
| Example A | 2 | 0 |
| Comparative Example (B) | 40 | 0.9 |
| Comparative Example (C) | 150 | 0.2 |

In the bearing structure of Example (A), the amount of upward displacement of the hub was extremely small even if an external impact was applied, and the fluctuation width of the motor current corresponding to the torque fluctuation was so small that it was substantially negligible. In the bearing structure of comparative example (B), on the other hand, the amount of upward displacement of the hub was 40 μm, due to suppression by the thrust plate. However, the fluctuation of rotational torque was increased by contact between the outer ring 2 and the thrust plate 40. In the bearing structure of comparative example (C), an extremely large amount of displacement of 150 μm was observed since this structure includes no means for suppressing upward displacement of the hub. From the aforementioned results, it has been proved that a high rotational accuracy can be maintained in the thrust direction with respect to a disturbance such as an impact from the exterior by providing the air dome portion 100.

In the bearing structure of Example (A), further, an impact test similar to the above was carried out in sample arrangements having a respective different height L of the air dome portion 100 in a range from 0.5 to 5 mm. The results are shown in Table 3.

TABLE 3

| L(mm) | Amount of Upward Displacement of Hub (μm) |
|---|---|
| 0.5 | 0.8 |
| 1 | 2 |
| 5 | 9 |

As obvious from the results of Table 3, it is understood that the effect of suppressing thrust-directional displacement is increased as the volume of the air dome portion 100 is reduced. This is conceivably because the rate of pressure change in the air dome portion 100 is increased as the volume of the air dome portion 100 is reduced.

Then, the bearing of the structural example C was mounted on the portion of the bearing 201 of the spindle motor shown in FIG. 8. In order to evaluate bearing performance of the structural example C, three types of bearings of Example (A) and comparative examples (B) and (C) shown in FIGS. 10A, 10B and 10C were mounted respectively on the spindle motor. An impact of 0.5 N·m was applied from the exterior while making the hub 204 rotate at 20,000 r.p.m. At this time, amounts of vertical movement of the upper surface of the hub 204 were measured with a laser displacement gauge, to measure the amounts of upward displacement of the hub 204. The extent or amount of fluctuation of motor current corresponding to torque fluctuation was also measured at the same time.

In the bearing structure of comparative example (C) (FIG. 10B), a thrust plate 40 was provided on an upper portion of the bearing, and a clearance between an outer ring 2 rotating at 20,000 r.p.m. and the thrust plate 40 was set at 50 μm. In the bearing structure of comparative example (B), an upper portion of the bearing was opened. In the three bearing structures of FIGS. 10A, 10B and 10C, the outer diameters of inner rings 1 were φ15 mm, and the radial clearances were 15 μm. In the bearing structure of Example (A) (FIG. 10A), an air vent hole 101 of φ0.5 mm was provided in a cover 4.

Results of the aforementioned evaluation are shown in Table 4.

TABLE 4

|  | Amount of Upward Displacement of Hub (μm) | Amount of Fluctuation of Motor Current (A) |
| --- | --- | --- |
| Example A | 3 | 0 |
| Comparative Example (B) | 50 | 0.8 |
| Comparative Example (C) | 180 | 0.1 |

Figure 10A:
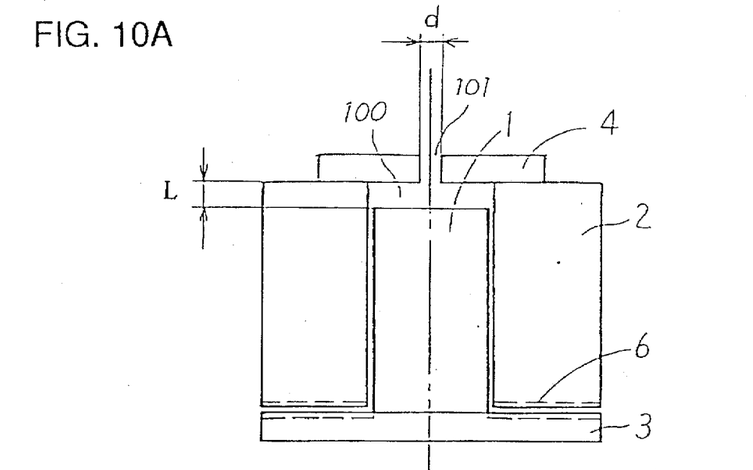
FIG. 10A is a schematic diagram showing Example (A) as a bearing employed for evaluating bearing performance of the structural example C of the composite bearing body according of the present invention.
Figure 10B:
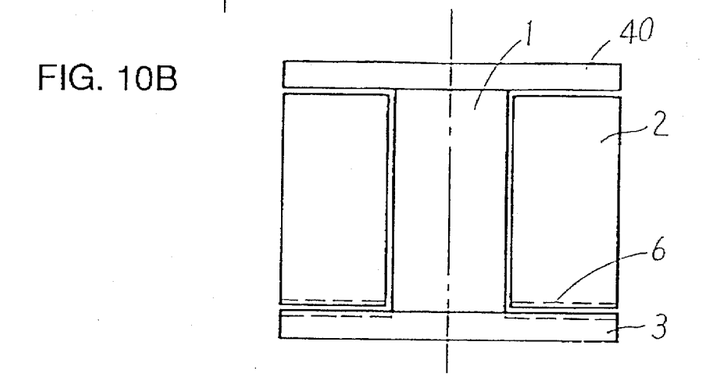
FIGS. 10B and 10C are schematic diagrams showing structures of comparative examples (B) and (C).
Figure 10C:
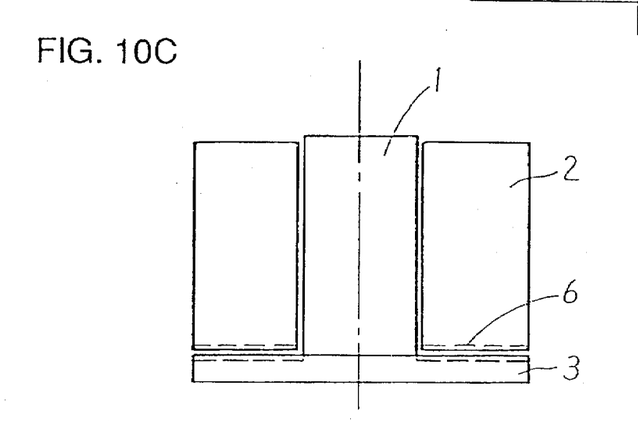

As can be seen from Table 4, the amount of upward displacement of the hub was extremely small in the bearing structure of Example (A) even if an impact was applied from the exterior, and the fluctuation width of the motor current corresponding to torque fluctuation was also so small that the same was substantially negligible. In the bearing structure of comparative example (B), on the other hand, the amount of upward displacement of the hub was 50 μm, due to suppression by the thrust plate. However, fluctuation of the motor current corresponding to rotational torque was increased by contact between the outer ring 2 and the thrust plate 40. In the bearing structure of comparative example (C), an extremely large amount of displacement of 180 μm was observed since no means for suppressing an upward displacement of the hub was provided.

From the aforementioned results, it has been proved that high rotational accuracy can be maintained in the thrust direction with respect to a disturbance, such as an impact from the exterior, by providing the air dome portion 100.

In the bearing structure of Example (A) (FIG. 10A), further, an impact test similar to the above was carried out in sample arrangements having a respective different height L of the air dome portion 100 in a range from 0.3 to 3 mm. The results are shown in Table 5.

TABLE 5

| L(mm) | Amount of Upward Displacement of Hub (μm) |
| --- | --- |
| 0.3 | 1 |
| 1 | 3 |
| 3 | 10 |

As can be seen from the results of Table 5, it is understood that the effect of suppressing thrust-directional displacement of the hub is increased as the volume of the air dome portion 100 is reduced. This is conceivably because the rate of pressure change in the air dome portion 100 is increased as the volume of the air dome portion 100 is reduced.

In the bearing structure of Example (A) (FIG. 10A), further, the diameter D of the air vent hole 101 provided in the cover 4 was changed in a range from 0.5 to 5 mm, and then an impact test similar to the above was carried out on the arrangements having different vent hole diameters. The results are shown in Table 6. In these tests it was set that L=1 mm.

TABLE 6

| D (mm) | Amount of Upward Displacement of Hub (μm) |
| --- | --- |
| 0.5 | 3 |
| 1 | 6 |
| 5 | 40 |

As shown in Table 6, the effect of suppressing the amount of upward displacement of the hub was also achieved when the diameter (D) of the air vent hole was 5 mm, as compared with the case of completely opening the upper portion of the bearing as in comparative example (C). In order to further suppress the amount of upward displacement of the hub, however, it is preferable to suppress or reduce the diameter of the air vent hole to the minimum size required for bleeding the air that is introduced along the thrust dynamic pressure producing grooves.

While a bearing body for a spindle motor used in a hard disk driver or a photomagnetic disk driver has been shown as an Example of the inventive composite bearing body, the present invention is not restricted to this application. The inventive composite bearing body is also applicable to a turbine bearing for a supercharger rotating at a high speed of 80000 to 150000 r.p.m., a bearing for a turbine or a compressor rotating at a high speed of 20000 to 30000 r.p.m., a high rotation bearing employed for a turbo-pump for a rocket engine, or a bearing employed for a machine tool such as a CNC ultraprecise lathe, a cylindrical working ultraprecise lathe, an ultraprecise surface grinder or the like.

As hereinabove described, the inventive composite bearing structure is suitable for supporting a rotator rotating at a high speed and is excellent in impact resistance and vibration resistance. The bearing structure is particularly applicable to a bearing body for a spindle motor which is employed for a hard disk driver or a photomagnetic disk driver.

Although the invention has been described with reference to specific example embodiments, it will be appreciated that it is intended to cover all modifications and equivalents within the scope of the appended claims.

We claim:

1. A composite bearing structure for supporting a rotator that is adapted to rotate at a high speed, said composite bearing structure comprising:

first bearing means (1, 2) including a ceramics sintered body for supporting a radial impact force that is applied to said rotator during rotation thereof;

second bearing means for supporting an axial load that is applied to said rotator while maintaining a prescribed clearance of said second bearing means and said rotator;

third bearing means for maintaining a radial rotational accuracy of said rotator; and fourth bearing means for maintaining a thrust-directional rotational accuracy of said rotator.

2. The composite bearing structure in accordance with claim 1, wherein said ceramics sintered body includes a silicon nitride ceramics sintered body.

3. The composite bearing structure in accordance with claim 2, wherein said silicon nitride ceramics sintered body includes silicon nitride containing crystal grains with a linear density of at least 35 grains per length of 30 μm with a grain boundary phase volume ratio of not more than 15 volume %, and containing pores having a maximum diameter of not more than 20 μm, the content of said pores being not more than 3%.

4. The composite bearing structure in accordance with claim 1, wherein said second bearing means includes dynamic gas pressure bearing means (6) for supporting said axial load by a gas pressure produced by rotation of said rotator.

5. The composite bearing structure in accordance with claim 4, wherein said dynamic gas pressure bearing means includes a rotating member (2) rotating with said rotator, and a fixed member (3) arranged opposite said rotating member with said clearance maintained axially therebetween.

6. The composite bearing structure in accordance with claim 5, wherein said rotating member and said fixed member include ceramics sintered bodies, and wherein at least one of said rotating member and said fixed member has a groove (6) therein for introducing a gas into said clearance for producing said gas pressure.

7. The composite bearing structure in accordance with claim 1, wherein said second bearing means includes magnetic bearing means (12, 13; 10, 17; 15, 16) for supporting said axial load through magnetic attraction or repulsion.

8. The composite bearing structure in accordance with claim 7, wherein said magnetic bearing means includes a rotating member (2) rotating with said rotator, and a fixed member (3; 13) arranged opposite said rotating member with said clearance maintained axially therebetween.

9. The composite bearing structure in accordance with claim 8, wherein said rotating member and said fixed member include magnets (12, 13; 10, 17; 15, 16) for producing said magnetic attraction or repulsion in said clearance.

10. The composite bearing structure in accordance with claim 1, wherein said third bearing means includes a ceramics sintered body for maintaining said radial rotational accuracy while maintaining a prescribed second clearance of said third bearing means and said rotator.

11. The composite bearing structure in accordance with claim 1, wherein said third bearing means includes dynamic gas pressure bearing means (5) for maintaining said rotational accuracy by a gas pressure produced by rotation of said rotator.

12. The composite bearing structure in accordance with claim 11, wherein said dynamic gas pressure bearing means includes a rotating member (2, 4) rotating with said rotator, and a fixed member (1) arranged opposite said rotating member with a radial clearance therebetween.

13. The composite bearing structure in accordance with claim 12, wherein said rotating member and said fixed member include ceramics sintered bodies, and wherein at least one of said rotating member and said fixed member has a groove (5) therein for introducing a gas into said radial clearance for producing said gas pressure.

14. The composite bearing structure in accordance with claim 1, wherein said third bearing means includes magnetic bearing means (8, 10, 11; 7, 8, 9, 10; 7, 8, 14, 15) for maintaining said rotational accuracy through magnetic attraction or repulsion while maintaining a prescribed second clearance of said third bearing means and said rotator.

15. The composite bearing structure in accordance with claim 14, wherein said magnetic bearing means includes a rotating member (2) rotating with said rotator, and a fixed member (1) arranged opposite said rotating member with said second clearance maintained radially therebetween.

16. The composite bearing structure in accordance with claim 15, wherein said rotating member and said fixed member include magnets (8, 10, 11; 7, 8, 9, 10; 7, 8, 14, 15) for producing said magnetic attraction or repulsion in said second clearance.

17. The composite bearing structure in accordance with claim 16, wherein said rotating member and said fixed member consist of bodies including said ceramics sintered body, and wherein said magnets (11) are embedded in an interior of said bodies.

18. The composite bearing structure in accordance with claim 1, wherein said fourth bearing means includes a rotating member (4) rotating with said rotator, a fixed member (1) arranged at least axially opposite said rotating member, and a gas dome (100) confined in a semi-closed state between said rotating member and said fixed member.

19. The composite bearing structure in accordance with claim 18, wherein said rotating member includes a first rotating portion (2) that is arranged radially opposite said fixed member (1) with a second clearance radially therebetween, and a second rotating portion (4) that is arranged axially opposite said fixed member (1) with said gas dome (100) axially interposed therebetween, and that is fixed to said first rotating portion (2).

20. The composite bearing structure in accordance with claim 19, wherein said second bearing means includes dynamic gas pressure bearing means (6) that introduce a gas into said prescribed clearance by rotation of said rotator, for supporting said axial load by a gas pressure produced by said rotation of said rotator, and wherein said second rotating portion (4) has a hole (101) for discharging said gas introduced into said prescribed clearance by said dynamic gas pressure bearing means.

21. The composite bearing structure in accordance with claim 19, wherein said third bearing means includes dynamic gas pressure bearing means (5) that introduce a gas into said prescribed clearance by rotation of said rotator, for maintaining said rotational accuracy by a gas pressure produced by said rotation of said rotator, and wherein said second rotating portion (4) has a hole (101) for discharging said gas introduced into said prescribed clearance by said dynamic gas pressure bearing means.

22. A composite bearing comprising:

a fixed member including a base plate and a cylindrical stub extending from said base plate;

a rotatable member including a cylindrical sleeve rotatably arranged coaxially and radially outwardly around said cylindrical stub and axially adjacent said base plate, and an axial end cover axially adjacent an axial end of said cylindrical stub opposite said base plate;

a radial impact supporting first bearing formed by said cylindrical sleeve rotatably arranged on said cylindrical stub, wherein at least one of said sleeve and said stub is a sintered ceramic body;

an axial load supporting second bearing that is arranged between said cylindrical sleeve and said base plate and that maintains therebetween an axial clearance during rotation of said rotatable member relative to said fixed member;

a radial rotational accuracy maintaining third bearing that is arranged between said cylindrical sleeve and said cylindrical stub and that maintains therebetween a radial clearance during rotation of said rotatable member relative to said fixed member; and an axial rotational accuracy maintaining fourth bearing that is arranged between said axial end of said cylindrical stub and said axial end cover;

wherein said second bearing comprises at least one of a magnetic repulsion bearing and a dynamic gas pressure bearing, and said fourth bearing comprises a gas dome at least partially enclosed in a space formed between said axial end of said cylindrical stub, said axial end cover and an end portion of said cylindrical sleeve.

23. The composite bearing in accordance with claim 22, wherein said sintered ceramic body comprises silicon nitride containing crystal grains with a linear density of at least 50 grains per length of 30 μm and a grain boundary phase volume ratio of not more than 15 volume %, and containing pores having a maximum diameter of not more than 20 μm with a pore content of not more than 3%.

* * * * *

UNITED STATES PATENT AND TRADEMARK OFFICE
CERTIFICATE OF CORRECTION

PATENT NO. : 5,675,201

DATED : Oct. 7, 1997

INVENTOR(S) : Komura et al.

It is certified that error appears in the above-identified patent and that said Letters Patent is hereby corrected as shown below:

Col. 1, line 67, after "space" insert --required therefor--.
Col. 2, line 65, delete "area in".
Col. 3, line 14, after "means" insert --,--;
line 29, delete "rate";

Col. 6, line 56, replace "EMBODIMENTSAND" by --EMBODIMENTS AND--;
Col. 9, line 2, delete "but";
line 3, replace "between" by --the--, delete "the".
Col. 10, line 25, replace "kept" by --maintained--.
Col. 11, line 49, delete "frequency".
Col. 12, line 48, replace "Sample" by --Samples--.
Col. 14, line 63, replace "(C)" by --(B)--;
line 67, replace "(B)" by --(C)--.

Signed and Sealed this

Twenty-seventh Day of January, 1998

Attest:

BRUCE LEHMAN

Attesting Officer

Commissioner of Patents and Trademarks